(12) United States Patent
Stratten

(10) Patent No.: US 7,547,055 B2
(45) Date of Patent: Jun. 16, 2009

(54) VEHICLE TAILGATE MOVEMENT ASSIST MECHANISM USING FOUR BAR LINKAGE AND STRUT

(75) Inventor: Eric L. Stratten, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/756,159

(22) Filed: May 31, 2007

(65) Prior Publication Data

US 2008/0196314 A1 Aug. 21, 2008

Related U.S. Application Data

(60) Provisional application No. 60/890,706, filed on Feb. 20, 2007.

(51) Int. Cl.
*B62D 33/03* (2006.01)
(52) U.S. Cl. .................................................. 296/57.1
(58) Field of Classification Search ................ 296/57.1; 74/520
See application file for complete search history.

(56) References Cited

U.S. PATENT DOCUMENTS

| | | | | |
|---|---|---|---|---|
| 3,637,097 A | * | 1/1972 | Horowitz | 414/557 |
| 3,883,014 A | | 5/1975 | Glomski et al. | |
| 3,977,718 A | * | 8/1976 | Nordberg | 296/57.1 |
| 4,040,654 A | | 8/1977 | Hill et al. | |
| 4,526,235 A | * | 7/1985 | Kinzenbaw | 172/126 |
| 4,564,325 A | * | 1/1986 | Ackerman | 414/24.5 |
| 5,234,249 A | | 8/1993 | Dorrell | |
| 5,271,652 A | | 12/1993 | Watanabe et al. | |
| 5,518,287 A | * | 5/1996 | Totani | 296/57.1 |
| 6,293,602 B1 | * | 9/2001 | Presley | 296/26.11 |
| 6,513,859 B2 | | 2/2003 | Yuge | |
| 6,773,047 B2 | | 8/2004 | Gruber | |
| 6,832,801 B2 | | 12/2004 | Zagoroff | |
| 6,857,679 B2 | | 2/2005 | Zagaroff | |
| 7,147,260 B2 | | 12/2006 | Eschebach et al. | |
| 7,287,803 B2 | * | 10/2007 | Koneval et al. | 296/146.4 |
| 2006/0244282 A1 | | 11/2006 | Benoit et al. | |

FOREIGN PATENT DOCUMENTS

JP 63064843 A * 3/1988
JP 06227439 A * 8/1994

* cited by examiner

*Primary Examiner*—Dennis H Pedder
(74) *Attorney, Agent, or Firm*—Gregory Brown; Price, Heneveld, Cooper, DeWitt & Litton, LLP

(57) ABSTRACT

A vehicle tailgate movement assist mechanism including a tailgate configured to rotate between opened and closed positions and a tailgate lever arm fixedly connected to a bottom area of the tailgate. A drive lever may be pivotally connected at one end thereof to the tailgate lever arm and pivotally connected at an opposite end thereof to a bell crank. The bell crank may be pivotally anchored at one end thereof to a vehicle body. A strut may be pivotally anchored at one end thereof to the vehicle body and pivotally connected at an opposite end thereof to the bell crank. With the mechanism configured as discussed above, rotation of the tailgate from a closed to an opened position simultaneously rotates the tailgate lever arm to impart movement to the drive lever and the bell crank to thereby actuate the strut to reduce an opening speed of the tailgate.

19 Claims, 8 Drawing Sheets

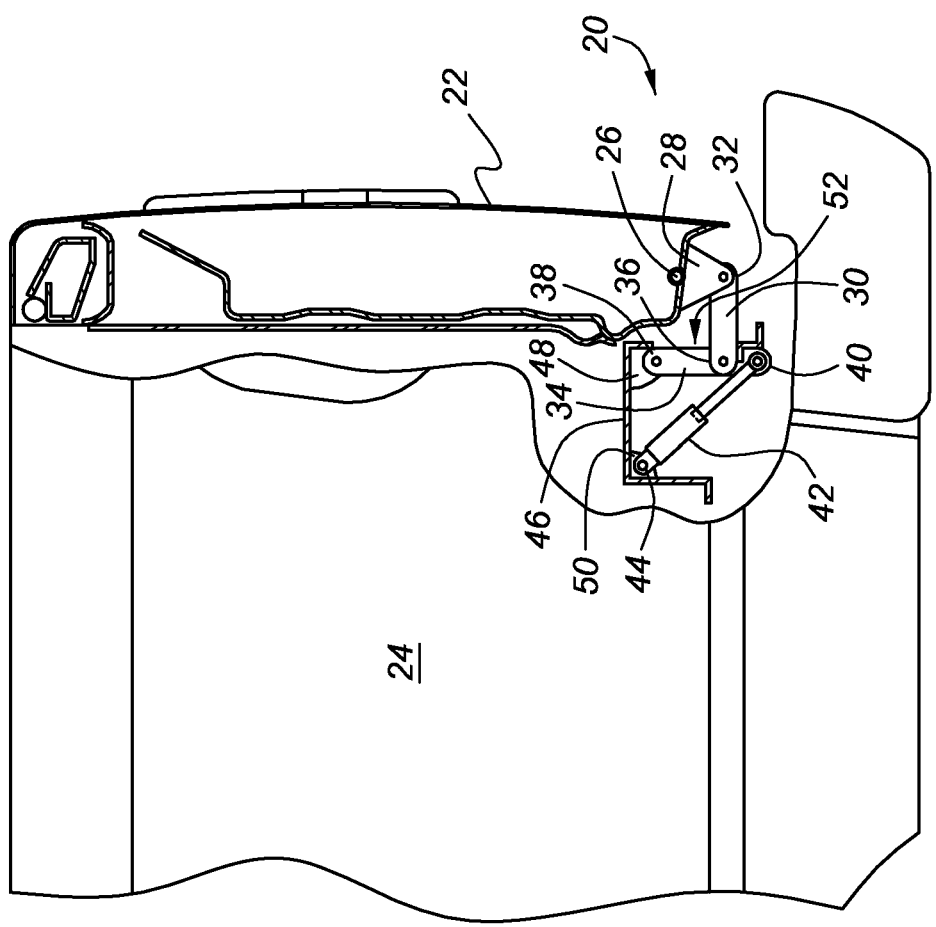

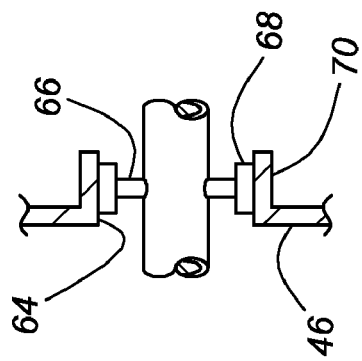
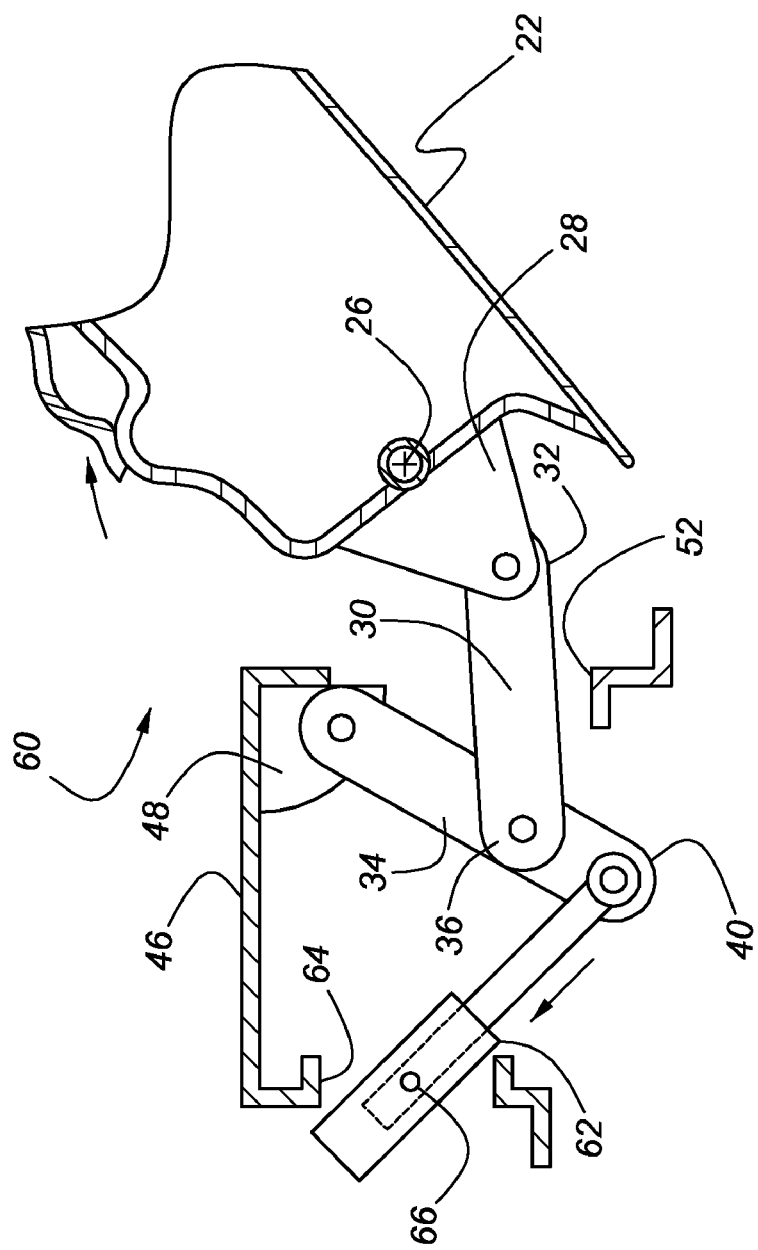
Fig. 9
Fig. 8

VEHICLE TAILGATE MOVEMENT ASSIST MECHANISM USING FOUR BAR LINKAGE AND STRUT

RELATED APPLICATIONS

This application claims benefit of priority of Provisional Application Ser. No. 60/890,706, filed Feb. 20, 2007, hereby incorporated by reference in its entirety.

BACKGROUND OF INVENTION a. Field of Invention

The invention relates generally to pivotable closure assemblies, such as tailgates, for pick up trucks, SUVs and other such vehicles, and more particularly, to a tailgate assembly which is capable of being opened and closed in an assisted manner and with a controlled velocity.

b. Description of Related Art

As is known in the art, pick up trucks, SUVs and other such vehicles generally include a tailgate having a variety of components for facilitating or limiting movement of the tailgate. For example, referring to FIGS. 1 and 2, a typical pick up truck 10 is illustrated including a tailgate 12 whose movement in the tailgate opening direction is controlled by tailgate pivot brackets 14. For conventional tailgates such as tailgate 12 of FIGS. 1 and 2, when the tailgate is moved from its closed position of FIG. 1 to its open position of FIG. 2, the tailgate generally pivots open under the force of gravity or with limited resistance by a torsion rod until pivotal movement thereof is stopped by brackets or cables 14. As readily evident, this pivotal movement is generally uncontrolled as the tailgate abruptly stops upon reaching its open horizontal position of FIG. 2. If the tailgate is inadvertently left in this open position during movement of the vehicle, the tailgate may bounce uncontrolled and thus prematurely damage the tailgate or its associated components.

Likewise, when tailgate 12 is moved from its open position of FIG. 2 to its closed position of FIG. 1, a user can often lift the tailgate with a force sufficient to lift the tailgate but insufficient for fully engage the tailgate's latching mechanism, thus requiring a second attempt to fully latch the tailgate. This is generally because the user must first lift the tailgate from its horizontal resting position, and once the tailgate is in motion, the user applies a lesser force to the tailgate as the force required to continue the closing motion is less than the initial force required to lift the tailgate.

In an effort to address the aforementioned drawbacks of conventional tailgates, a variety of mechanisms have been proposed for assisting with the tailgate closing function, as well as for controlling the tailgate opening velocity.

One such exemplary design for assisting with the tailgate closing function is disclosed in U.S. Pat. No. 6,773,047 to Gruber. Specifically, referring to FIGS. 4 and 5 of Gruber, there disclosed a vehicle tailgate lift system including an energy storage device (10) located within a vehicle body adjacent the D-pillar and pivotally anchored to the vehicle body. A bellcrank arm (13) is pivotally attached to energy storage device (10) and rigidly attached to an actuation shaft (14; see FIG. 2) that is coaxially aligned with tailgate (2) and its pivot axis. As tailgate (2) is moved from its open position of FIG. 4 to its closed position of FIGS. 1 and 5, stored energy in device (10) at the tailgate open position is released to assist with the tailgate closing function.

While the tailgate lift system of Gruber provides adequate lift assistance, the mechanism nevertheless has several drawbacks related to packaging, operation and adjustability thereof. For example, referring to FIGS. 4 and 5 of Gruber, the Gruber tailgate lift system includes a relatively long energy storage device (10) and similarly long bellcrank arm (13) for generating an adequate moment for rotating tailgate (2), with device (10) being pivotally mounted to the side wall in the D-pillar area. As readily evident, the size of device (10) and bellcrank arm (13) require these components to be installed in the D-pillar area, which is itself limited in space due to the structural rigidity and performance requirements for this area. Since energy storage device (10) provides the primary force for assisting with movement of tailgate (2), adjustability in the opening or closing movement of tailgate (2) is limited to the operational parameters of device (10), which as discussed above, can itself in conjunction with bellcrank arm (13) be a design drawback due to the large size thereof.

Another exemplary design for assisting with a tailgate opening/closing function is disclosed in U.S. Pat. No. 5,271,652 to Watanabe. Specifically, referring to FIGS. 1-3 of Watanabe, there disclosed a device for applying an auxiliary force to a loading deck side plate (13). The device includes a spring (20) for pulling rod (21) attached to an intermediate link (25), with link (25) being connected to a swing link (16) connected to side plate (13). As with the lift assist device of Gruber, while the Watanabe device functions to assist with the opening and closing of side plate (13), the device nevertheless is incapable of a smooth opening/closing operation due to the fact that swing link (16) abruptly rotates during opening or closing of side plate (13) as illustrated in the FIGS. 1-3, and is therefore undesirable for use as a tailgate assist device.

Yet further, another exemplary design for assisting with a tailgate opening/closing function is disclosed in U.S. Pat. No. 3,883,014 to Glomski. As illustrated in FIGS. 1 and 2 of Glomski, there is disclosed a tailgate lift mechanism including cylinder (39) for actuating piston rod (40) to drive bell crank levers (42-44), which in turn drive tie rod (45) to further drive pivot links (45), which yet further drive lift arms (30) to lift the tailgate. As readily evident, the interaction and operation of the several links for Glomski render the tailgate mechanism thereof susceptible to premature malfunction, and further, the mechanism is generally required to be installed below vehicle bed (19) due to the several linkages required for adequate operation.

It is therefore desirable to provide a vehicle tailgate movement assist mechanism which may be installed adjacent the vehicle D-pillar, or along the width of the vehicle bed, without significantly impacting the space required for other structural components, or without being visible to a user. It is also desirable to provide a vehicle tailgate movement assist mechanism which is capable of being readily tuned and adjusted to a user's operational parameters, which includes a minimal number of components for thus simplifying the manufacturing and assembly steps required for such components, and which provides a smooth opening or closing assist operation.

SUMMARY OF THE INVENTION

The invention solves the problems and overcomes the drawbacks and deficiencies of prior art vehicle tailgate opening and closing assist devices by providing a vehicle tailgate movement assist mechanism including a tailgate configured to rotate between opened and closed positions, and a tailgate lever arm fixedly connected to a bottom area of the tailgate. A drive lever may be pivotally connected at one end thereof to the tailgate lever arm and pivotally connected at an opposite end thereof to a bell crank. The bell crank may be pivotally anchored at one end thereof to a vehicle body, and a strut may be pivotally anchored at one end thereof to the vehicle body and pivotally connected at an opposite end thereof to the bell crank. With the mechanism configured as discussed, rotation of the tailgate from a closed to an opened position simultaneously rotates the tailgate lever arm to impart movement to the drive lever and the bell crank to thereby actuate the strut to reduce an opening speed of the tailgate.

For the vehicle tailgate movement assist mechanism described above, the strut may be pivotally connected at the opposite end thereof to an opposite end of the bell crank. Alternatively, the strut may be pivotally connected at the opposite end thereof along an intermediate position along a length of the bell crank. With the tailgate lever arm, drive lever, bell crank and strut configured as discussed above, rotation of the tailgate from an opened to a closed position simultaneously rotates the tailgate lever arm to impart movement to the drive lever and the bell crank to thereby release energy of the strut to assist with closing of the tailgate. In particular embodiments of the present invention, the strut may be a gas spring energy storage device, a velocity based damper, or a linear spring device. Further, in a particular embodiment, the strut may be pivotally anchored to a vehicle rear sill, and the mechanism may partially protrude through a cutout in the vehicle rear sill. Yet further, in a particular embodiment, the mechanism may be disposed adjacent a vehicle D-pillar, or alternatively, the mechanism may be disposed at an intermediate location along a width of the tailgate. Moreover, the drive lever, bell crank and/or strut may be disposed generally within the vehicle rear sill.

The invention also provides a vehicle tailgate movement assist mechanism including a tailgate configured to rotate between opened and closed positions, and a tailgate lever arm fixedly connected to a bottom area of the tailgate. A drive lever may be pivotally connected at one end thereof to the tailgate lever arm and pivotally connected at an opposite end thereof to a bell crank. The bell crank may be pivotally anchored at one end thereof to a vehicle body, and a strut may be pivotally connected at a first location thereof to the vehicle body and pivotally connected at a second location thereof to the bell crank. With the mechanism configured as discussed, rotation of the tailgate from a closed to an opened position simultaneously rotates the tailgate lever arm to impart movement to the drive lever and the bell crank to thereby actuate the strut to reduce an opening speed of the tailgate.

For the vehicle tailgate movement assist mechanism described above, the strut may be pivotally connected at the second location thereof to an opposite end of the bell crank. Alternatively, the strut may be pivotally connected at the second location thereof along an intermediate position along a length of the bell crank. With the tailgate lever arm, drive lever, bell crank and strut configured as discussed above, rotation of the tailgate from an opened to a closed position simultaneously rotates the tailgate lever arm to impart movement to the drive lever and the bell crank to thereby release energy of the strut to assist with closing of the tailgate. As discussed above, the strut may be a gas spring energy storage device, a velocity based damper, or a linear spring device. The strut may be pivotally connected to a vehicle rear sill and protrude through a cutout in the rear sill. Further, the mechanism may partially protrude through another cutout in the vehicle rear sill. In particular embodiments, the mechanism may be disposed adjacent a vehicle D-pillar, or alternatively, the mechanism may be disposed at an intermediate location along a width of the tailgate. Moreover, the drive lever, bell crank and/or strut may be disposed generally within the vehicle rear sill.

The invention yet further provides a vehicle tailgate movement assist mechanism including, a tailgate configured to rotate between opened and closed positions, and a tailgate lever arm connected to the tailgate. A drive lever may be pivotally connected at a first location thereof to the tailgate lever arm and pivotally connected at a second location thereof to a bell crank. The bell crank may be pivotally anchored at a first location thereof to a vehicle body, and a strut may be pivotally anchored at a first location thereof to the vehicle body and pivotally connected at a second location thereof to the bell crank. With the mechanism configured as discussed, rotation of the tailgate from a closed to an opened position simultaneously rotates the tailgate lever arm to impart movement to the drive lever and the bell crank, and movement of the tailgate, the tailgate lever arm, the drive lever and/or the bell crank may directly or indirectly cause actuation of the strut to reduce an opening speed of the tailgate. Further, rotation of the tailgate from an opened to a closed position simultaneously rotates the tailgate lever arm to impart movement to the drive lever and the bell crank, and movement of the tailgate, the tailgate lever arm, the drive lever and/or the bell crank may directly or indirectly cause release of energy of the strut to assist with closing of the tailgate.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 3 is a side cutout view illustrative of an embodiment of a vehicle tailgate movement assist mechanism according to the present invention, illustrating the tailgate in a closed position;

FIG. 8 is a side cutout view illustrative of another embodiment of a vehicle tailgate movement assist mechanism according to the present invention, illustrating the tailgate at an intermediate position; and FIG. 9 is a top view illustrative of the vehicle tailgate movement assist mechanism of FIG. 8.

DETAILED DESCRIPTION OF THE PREFERRED EMBODIMENTS

Figure 1:
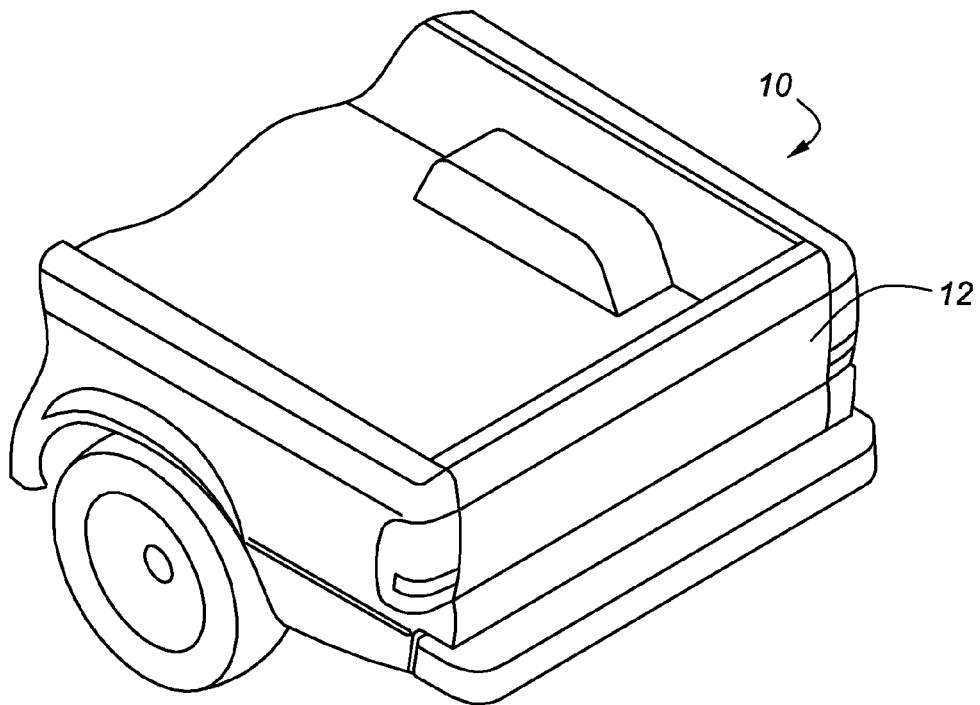
FIG. 1 is an isometric view of a pick up truck including a conventional tailgate pivot control mechanism, with the tailgate disposed in a closed configuration.

Referring now to the drawings wherein like reference numerals designate corresponding parts throughout the several views, FIGS. 3-7 illustrate various views of an embodiment of a vehicle tailgate opening and closing assist mechanism according to the present invention, the mechanism being hereinafter generally designated "tailgate movement assist mechanism 20," and FIGS. 8 and 9 illustrate another embodiment thereof, hereinafter generally designated "tailgate movement assist mechanism 60."

Figure 3A:
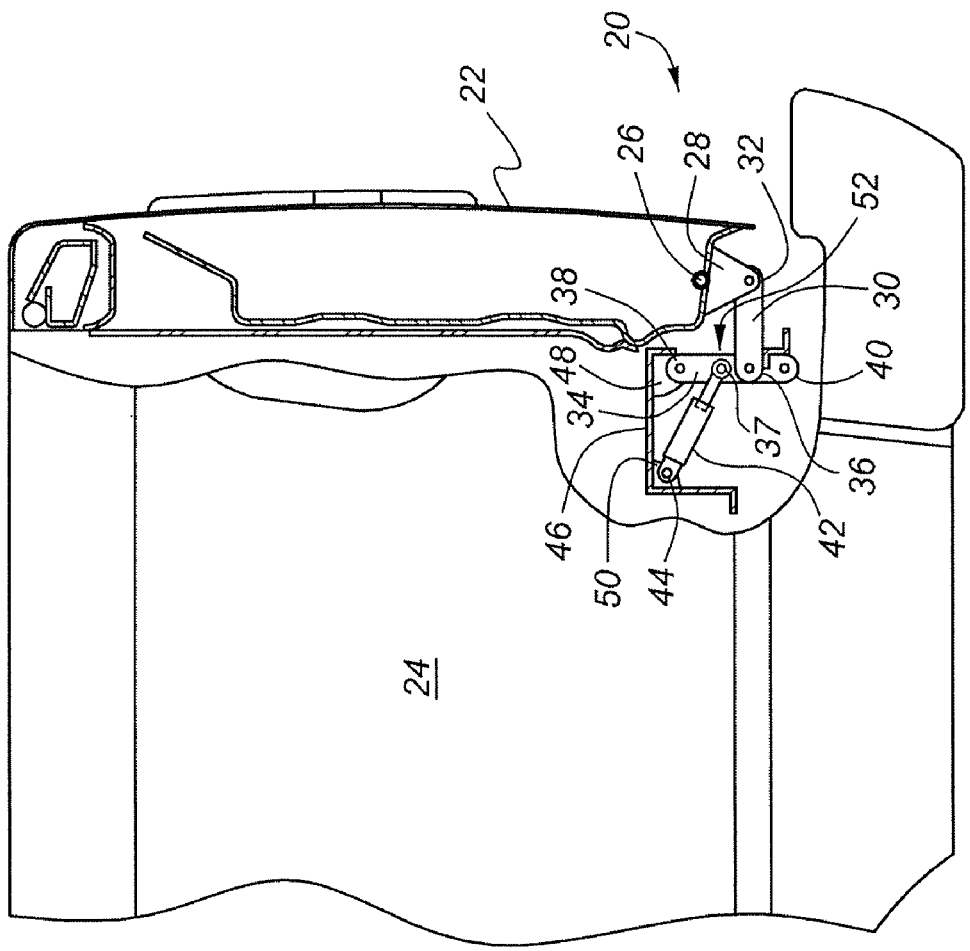
FIG. 3A is a side cutout view illustrative of an embodiment of a vehicle tailgate movement assist mechanism according to one embodiment, illustrating the tailgate in a closed position, with a strut connected to an intermediate position of a bell crank.
Figure 4:
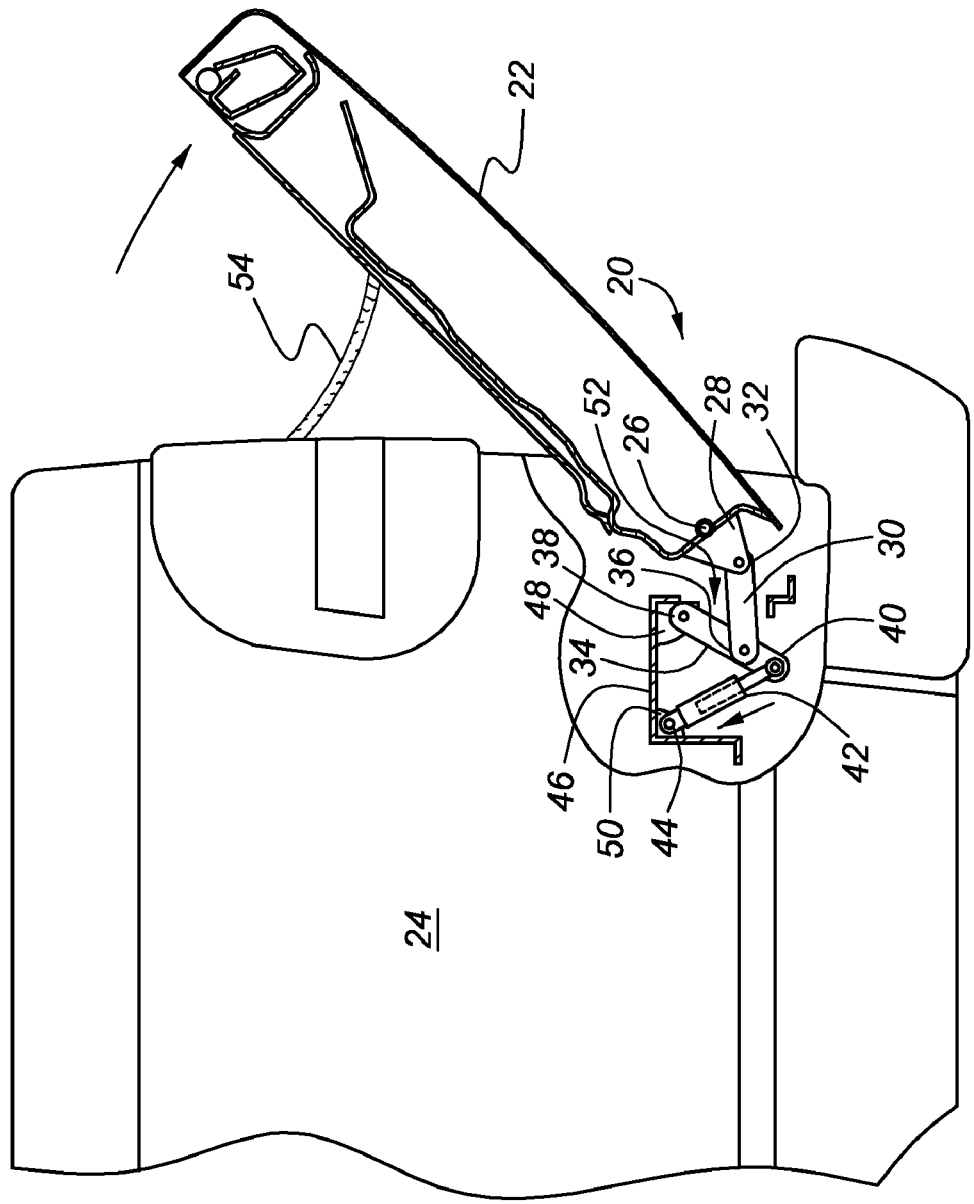
FIG. 4 is a side cutout view illustrative of the vehicle tailgate movement assist mechanism of FIG. 3, illustrating the tailgate at an approximately 45° angle.
Figure 5:
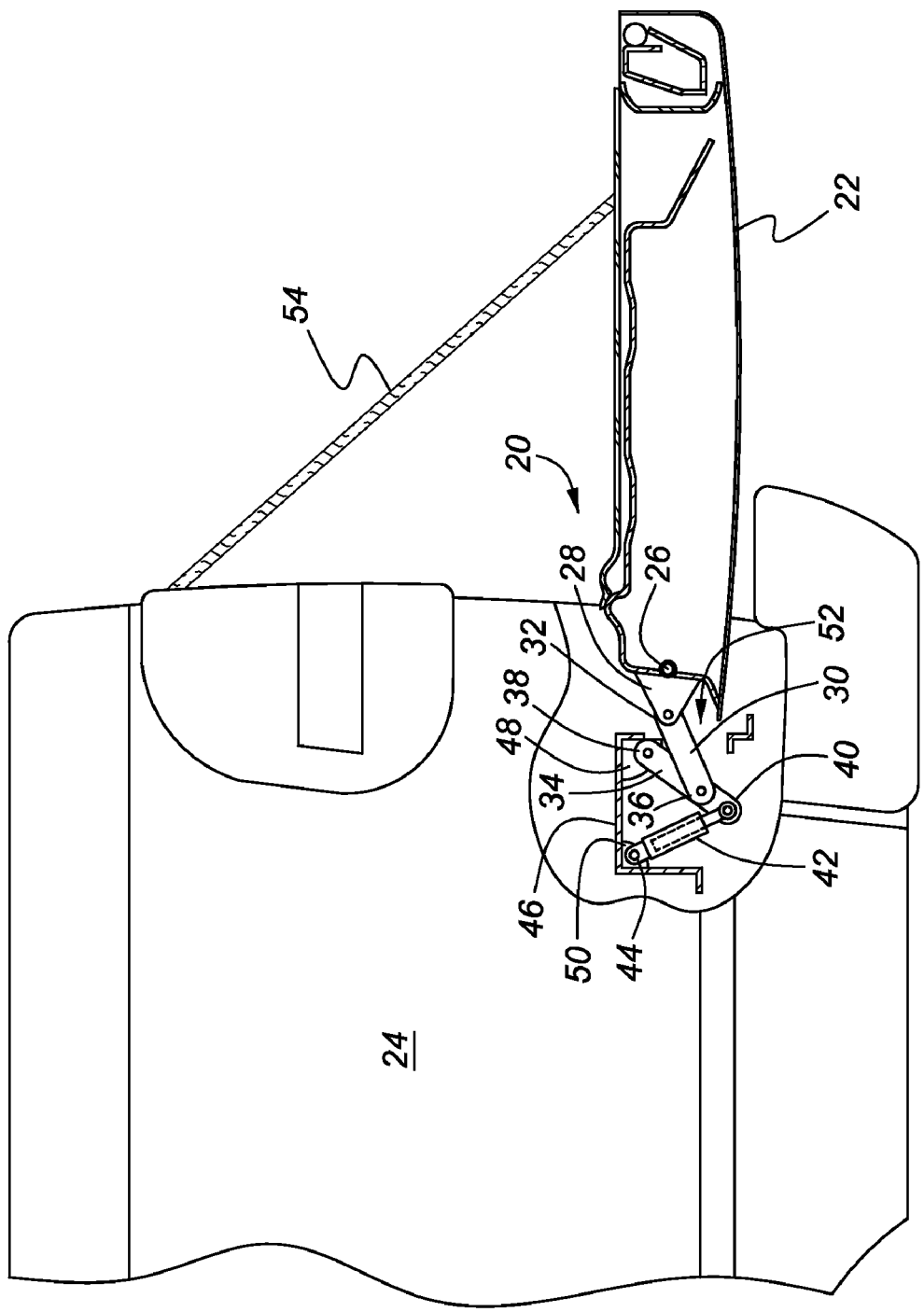
FIG. 5 is a side cutout view illustrative of the vehicle tailgate movement assist mechanism of FIG. 3, illustrating the tailgate in a fully open position.
Figure 6:
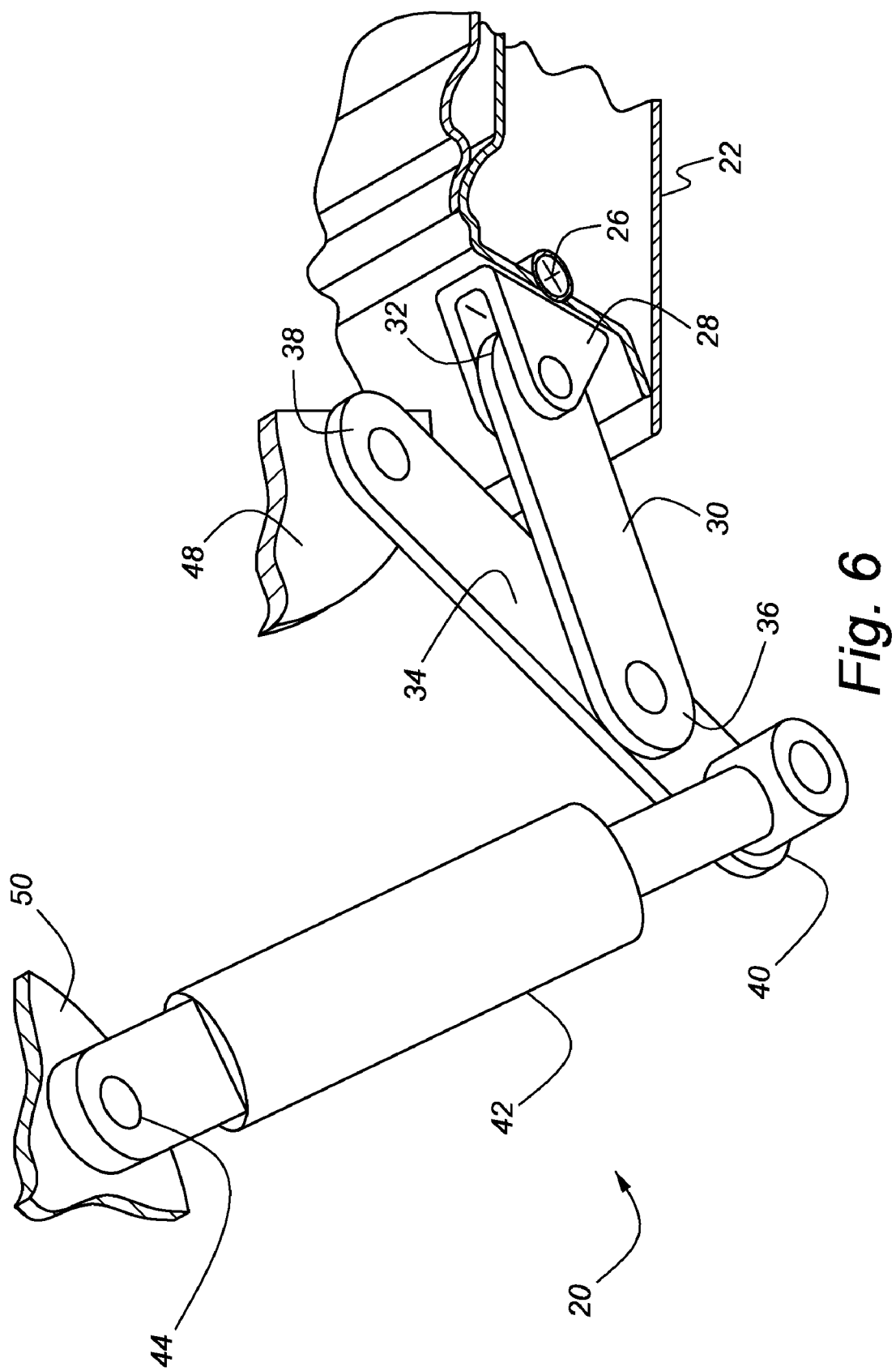
FIG. 6 is an isometric view of the components of the vehicle tailgate movement assist mechanism of FIG. 3.
Figure 7:
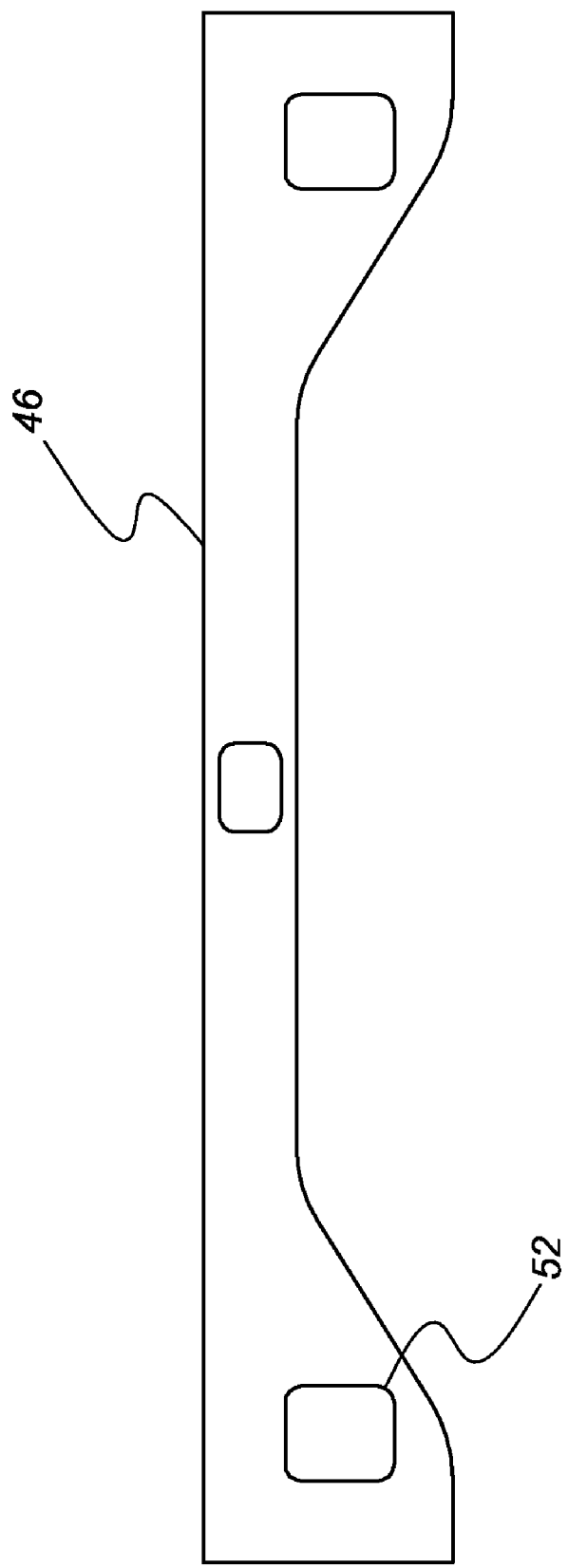
FIG. 7 is a view illustrative of a rear sill including exemplary cutouts for proper installation and operation of the vehicle tailgate movement assist mechanism of FIG. 3.

Referring to FIGS. 3-7, tailgate movement assist mechanism 20 may generally include a tailgate 22 pivotally mounted to vehicle side wall 24 at pivot point 26. A tailgate lever arm 28 may be fixedly mounted to tailgate 22 on the lower end thereof. A drive link 30 may be pivotally connected to tailgate lever arm 28 at end 32 thereof and to a bell crank 34 at opposite end 36 thereof. In the particular embodiment illustrated, drive link 30 may be disposed in a generally horizontal configuration in the tailgate closed position of FIG. 3. However, as discussed below, those skilled in the art would readily appreciate in view of this disclosure that link 30 may be disposed at a different angle as needed for adequate movement assist of tailgate 22. Bell crank 34 may include a first end 38 pivotally anchored to a vehicle structural component such as side wall 24, or as shown, to a rear sill structural component 46 at location 48 thereof and disposed adjacent or between side walls 24. In this manner, if needed, mechanism 20 may be attached at a location between side walls 24 as opposed to in the area occupied by a vehicle D-pillar. The other end 40 of bell crank 34 may be pivotally connected to a strut 42, which may be further pivotally anchored at end 44 thereof to a vehicle structural component such as side wall 24, or as shown, to rear sill structural component 46 at location 50 thereof and disposed adjacent or between side walls 24, depending on the anchored attachment of end 38 of the bell crank. Strut 42 may be a gas spring energy storage device, a velocity based damper, or another damping or linear spring device known in the art, including viscous damping in the compression direction to limit the opening velocity of tailgate 22. It should be noted that if strut 42 is configured as a damper only, strut 42 would include a spring or another feature sufficient for extending the strut damping element from its compressed state. In a similar manner, based on the energy stored therein, strut 42 may assist a user with closing of tailgate 22. Rear sill structural component 46 may include a cut-out 52 for drive link 30, and as shown in FIG. 7 and as briefly discussed above, cut-outs 52 may be disposed adjacent side walls 24 or at an intermediate location between side walls 24. Further, as illustrated in FIGS. 4 and 5, a cable or tailgate pivot bracket 54 may be provided in a known manner for limiting rotation of tailgate 22 in its fully open direction, and for supporting the tailgate and any loads applied thereto by a user during normal use.

The operation of tailgate movement assist mechanism 20 will now be described in detail with reference to FIGS. 3-7.

Specifically, with tailgate 22 disposed in its fully upright and closed position of FIG. 3, a user may unlatch tailgate 22 in a known manner and pull tailgate 22 in the clock-wise direction in FIG. 3. With strut 42 tuned as an energy storage device and a damper, as the user allows tailgate 22 to drop under its weight relative to pivot point 26, lever arm 28 may rotate in a clock-wise direction along with tailgate 22 to translate drive link 30 toward the left, which further rotates bell crank 34 in a clock-wise direction to actuate strut 42 in its compression direction. As tailgate 22 continues its clockwise rotation about its pivot point 26 from the FIG. 3 to the FIG. 4 positions, an increase in the velocity of tailgate 22 as the tailgate rotates in a clock-wise direction under its weight causes actuation of the damping function of strut 42 to thus bring tailgate 22 to a "soft" stop as shown in FIG. 5. Moreover, if needed, the entire rotation of tailgate 22 from its closed position of FIG. 3 to its opened position of FIG. 5 may be controlled by means of the damping characteristics of strut 42.

When tailgate 22 is lifted (i.e. rotated in a counter clockwise direction in the FIG. 5 configuration) from its fully open position of FIG. 5 to its fully closed position of FIG. 3, the spring energy stored in strut 42 may be released to thus assist the user with lifting and thereafter full closing of the tailgate. Thus as discussed above with reference to the opening function of tailgate 22, the entire rotation of tailgate 22 from its opened position of FIG. 5 to its closed position of FIG. 3 may be controlled or assisted by means of strut 42.

Referring next to FIGS. 8 and 9, another embodiment of the tailgate movement assist mechanism, designated tailgate movement assist mechanism 60, will now be described in detail.

Specifically, compared to mechanism 20, tailgate movement assist mechanism 60 generally differs in its location and orientation of strut 62. Compared to mechanism 20 which includes strut 42 disposed in the area of rear sill structural component 46 and anchored at location 50 thereof, mechanism 60 may include strut 62 extending through the rear sill area via cutout 64. In order to anchor and allow for pivotal movement of strut 62, as shown in FIG. 9, a pair of pivot pins 66 may be provided on opposite surfaces of strut 62. Pivot pins 66 may be retained in pivot seats 68 by clips or other means known in the art, and pivot seats 68 may be attached to protrusions 70 which, in the exemplary embodiment illustrated, are formed by the remaining surface of cutout 64. In this manner, as tailgate 22 is rotated from its closed position of FIG. 3 to its fully open position of FIG. 5, tailgate lever arm 28, drive link 30 and bell crank 34 rotate and translate as discussed above with reference to mechanism 20. However, compared to strut 42 for mechanism 20, strut 62 instead pivots about pivot seats 68 to thus allow full opening/closing operation of tailgate 22.

As readily evident, the layout of mechanism 60 is beneficial in use with struts 62 of an extended length compared to strut 42 of mechanism 20, without requiring structural re-design of the sill or related areas.

Figure 2:
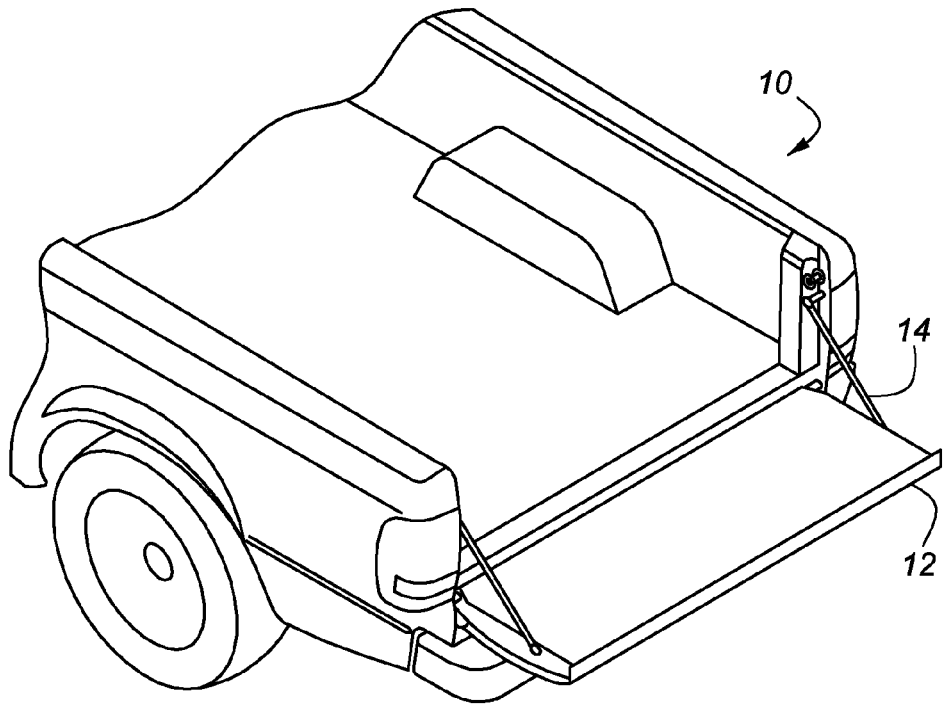
FIG. 2 is an isometric view of the pick up truck of FIG. 1, including the conventional tailgate pivot control mechanism, with the tailgate disposed in an open configuration.

As briefly discussed above, compared to conventional tailgate pivot control mechanisms such as the mechanisms illustrated in FIGS. 1 and 2, and the mechanisms disclosed in U.S. Pat. No. 6,773,047 to Gruber and U.S. Pat. No. 5,271,652 to Watanabe, the present invention tailgate movement assist mechanisms 20, 60 may be located anywhere along the bottom of tailgate 22 due to their minimal packaging requirements. For example, as also discussed above, as illustrated in FIGS. 4 and 5 of Gruber, the Gruber tailgate lift system includes a relatively long energy storage device (10) and similarly long bellcrank arm (13), with device (10) being pivotally mounted to the side wall in the D-pillar area. The relatively long size of device (10) and bellcrank arm (13) require these components to be installed in the D-pillar area, which is itself limited in space due to the structural rigidity and performance requirements for this area. Since energy storage device (10) provides the primary force for assisting with movement of tailgate (2), adjustability in the opening or closing movement of tailgate (2) is limited to the operational parameters of device (10), which as discussed above, can itself in conjunction with bellcrank arm (13) be a design drawback due to the large size thereof. Further, since the primary focus in the D-pillar area is on the structural rigidity and performance of this area, the Gruber tailgate lift system must operate in a limited area, which can compromise the overall performance of the Gruber system.

Yet further, compared to conventional tailgate pivot control mechanisms such as the mechanisms illustrated in FIGS. 1 and 2, and the mechanisms disclosed in U.S. Pat. No. 6,773,047 to Gruber and U.S. Pat. No. 5,271,652 to Watanabe, as briefly discussed above, the present invention tailgate movement assist mechanisms 20, 60 may be readily adapted for use only as a damping device or as a damper and energy storage device by modifying struts 42, 62. Further, as discussed below, mechanisms 20, 60 may be readily tuned by simply changing the geometry of tailgate lever arm 28, drive link 30 and/or bell crank 34.

Those skilled in the art would readily appreciate in view of this disclosure that various modifications could be made to tailgate movement assist mechanisms 20, 60 described above, without departing from the scope of the present invention. For example, the position of the strut 42 (and strut 62) attachment to bell crank 34 may be modified as needed depending on design requirements. Referring to FIG. 3, if strut 42 (and strut 62) is positioned beyond drive link 30 as shown, this configuration provides for increased strut travel, but a decrease in the strut mechanical advantage. Alternatively, if strut 42 (and strut 62) is positioned above end 36 of the drive link 30 pivot on the bell crank, this configuration provides for less travel of the strut, but an increase in the mechanical advantage. Such positioning is illustrated in FIG. 3A at connection point 37. The optimal location of strut 42 (and strut 62) relative to drive link 30 and bell crank 34 may thus be chosen based on the aforementioned performance requirements. Likewise, the geometry of tailgate lever arm 28, drive link 30 and bell crank 34 may be tailored to a particular application to provide the required travel, velocity, and mechanical advantage profiles as mechanisms 20, 60 articulate thru the opening and closing travel of the tailgate. The position and orientation of struts 42, 62 may also be altered based on packaging and mechanical requirements. For example, struts 42, 62 may be oriented horizontally or vertically downward as compared to the upward, angled orientation shown in FIG. 3. Further, referring to FIG. 7, mechanisms 20, 60 may be used in the area of cutouts 52 at the left and right side of the sill, or a single mechanism may be used at a central location along the sill or at another suitable location along the sill. Moreover, whereas struts 42, 62 have been illustrated as being connected to the bell crank, the struts may be alternatively contiguously and pivotally engaged with the bell crank by engagement with a concave groove (not shown) in the bell crank.

Yet further, the components of tailgate movement assist mechanisms 20, 60 may be configured as needed based on the operational and packaging requirements of a particular vehicle. For example, as shown in FIG. 6, tailgate lever arm 28 may include a u-shaped connection for insertion of drive link 30 and retention therein by a pivot pin or similar nut/bolt type assembly. Drive link 30, bell crank 34 and strut 42 (and strut 62) may be pivotally connected to each other by similar pivot pin or nut/bolt type assemblies, and include bearings and other assembly components as needed as would be readily evident to those skilled in the art.

Moreover, with mechanisms 20, 60 configured as discussed, as explained in detail above, rotation of the tailgate from a closed to an opened position simultaneously rotates the tailgate lever arm to impart movement to the drive lever and the bell crank, and movement of the tailgate, the tailgate lever arm, the drive lever and/or the bell crank may directly or indirectly cause actuation of the strut to reduce an opening speed of the tailgate. Further, rotation of the tailgate from an opened to a closed position simultaneously rotates the tailgate lever arm to impart movement to the drive lever and the bell crank, and movement of the tailgate, the tailgate lever arm, the drive lever and/or the bell crank may directly or indirectly cause release of energy of the strut to assist with closing of the tailgate. In this regard, a control device (i.e. an actuator, trigger, movement sensor etc.; not shown) may be mounted at a suitable location on the strut or away from the strut, respectively, such that movement of the aforementioned components directly or indirectly causes actuation or release of energy of the strut as needed.

To summarize, referring to FIGS. 3-9, the present invention thus provides vehicle tailgate movement assist mechanisms 20, 60 which may be installed adjacent the vehicle D-pillar, or along the width of the vehicle bed, without significantly impacting the space required for other structural components, or without being visible to a user due to their installation generally within the vehicle rear sill and at the bottom area of the tailgate. As discussed above, mechanisms 20, 60 are also capable of being readily tuned and adjusted to a user's operational parameters, and include a minimal number of components for thus simplifying the manufacturing and assembly steps required for such components. Further, if tailgate 22 is inadvertently left in an open position during movement of the vehicle, the operational engagement of tailgate lever arm 28, drive link 30, bell crank 34 and strut 42 (or 62) functions to reduce uncontrolled movement of the tailgate. Moreover, when struts 42, 62 are configured as an energy storage device for providing lift assist for tailgate 22, mechanisms 20, 60 can provide for the possible elimination or reduction in the size and force of conventional lift assist springs or torsion rods.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A vehicle tailgate movement assist mechanism comprising:

a manually actuated tailgate configured to rotate substantially 90 degrees between opened and closed positions;

a tailgate lever arm fixedly connected to a bottom area of the tailgate;

a drive lever pivotally connected at one end thereof to said tailgate lever arm and pivotally connected at an opposite end thereof to a bell crank, said bell crank pivotally anchored at one end thereof to a vehicle body; and a strut pivotally anchored at one end thereof to the vehicle body and pivotally connected at an opposite end thereof to said bell crank, wherein said bell crank and strut are pivotally connected generally within a vehicle rear sill, and wherein rotation of the tailgate from a closed to an opened position simultaneously rotates said tailgate lever arm to impart movement to said drive lever and said bell crank to thereby actuate said strut to reduce an opening speed of the tailgate.

2. A vehicle tailgate movement assist mechanism according to claim 1, wherein said strut is pivotally connected at said opposite end thereof to an opposite end of said bell crank.

3. A vehicle tailgate movement assist mechanism according to claim 1, wherein said strut is pivotally connected at said opposite end thereof along an intermediate position along a length of said bell crank.

4. A vehicle tailgate movement assist mechanism according to claim 1, wherein rotation of the tailgate from an opened to a closed position simultaneously rotates said tailgate lever arm to impart movement to said drive lever and said bell crank to thereby release energy of said strut to assist with closing of the tailgate.

5. A vehicle tailgate movement assist mechanism according to claim 1, wherein said strut is one of a gas spring energy storage device, a velocity based damper, and a linear spring device.

6. A vehicle tailgate movement assist mechanism according to claim 1, wherein said mechanism partially protrudes through a cutout in the vehicle rear sill.

7. A vehicle tailgate movement assist mechanism according to claim 1, wherein said mechanism is disposed adjacent a vehicle D-pillar.

8. A vehicle tailgate movement assist mechanism according to claim 1, wherein said mechanism is disposed at a location along a width of the tailgate.

9. A vehicle tailgate movement assist mechanism comprising:
a manually actuated tailgate configured to rotate substantially 90 degrees between opened and closed positions;
a tailgate lever arm fixedly connected to a bottom area of the tailgate;
a drive lever pivotally connected at one end thereof to said tailgate lever arm and pivotally connected at an opposite end thereof to a bell crank, said bell crank pivotally anchored at one end thereof to a vehicle body; and
a strut pivotally connected at a first location thereof to the vehicle body and pivotally connected at a second location thereof to said bell crank,
wherein said bell crank and strut are pivotally connected generally within a vehicle rear sill, and wherein rotation of the tailgate from a closed to an opened position simultaneously rotates said tailgate lever arm to impart movement to said drive lever and said bell crank to thereby actuate said strut to reduce an opening speed of the tailgate.

10. A vehicle tailgate movement assist mechanism according to claim 9, wherein said strut is pivotally connected at said second location thereof to an opposite end of said bell crank.

11. A vehicle tailgate movement assist mechanism according to claim 9, wherein said strut is pivotally connected at said second location thereof along an intermediate position along a length of said bell crank.

12. A vehicle tailgate movement assist mechanism according to claim 9, wherein rotation of the tailgate from an opened to a closed position simultaneously rotates said tailgate lever arm to impart movement to said drive lever and said bell crank to thereby release energy of said strut to assist with closing of the tailgate.

13. A vehicle tailgate movement assist mechanism according to claim 9, wherein said strut is one of a gas spring energy storage device, a velocity based damper, and a linear spring device.

14. A vehicle tailgate movement assist mechanism according to claim 9, wherein said strut protrudes through a cutout in the rear sill.

15. A vehicle tailgate movement assist mechanism according to claim 14, wherein said mechanism partially protrudes through another cutout in the vehicle rear sill.

16. A vehicle tailgate movement assist mechanism according to claim 9, wherein said mechanism is disposed adjacent a vehicle D-pillar.

17. A vehicle tailgate movement assist mechanism according to claim 9, wherein said mechanism is disposed at a location along a width of the tailgate.

18. A vehicle tailgate movement assist mechanism comprising:
a manually actuated tailgate configured to rotate substantially 90 degrees between opened and closed positions;
a tailgate lever arm connected to the tailgate;
a drive lever pivotally connected at a first location thereof to said tailgate lever arm and pivotally connected at a second location thereof to a bell crank, said bell crank pivotally anchored at a first location thereof to a vehicle body; and
a strut pivotally anchored at a first location thereof to the vehicle body and pivotally connected at a second location thereof to said bell crank,
wherein rotation of the tailgate from a closed to an opened position simultaneously rotates said tailgate lever arm to impart movement to said drive lever and said bell crank, wherein movement of at least one of the tailgate, said tailgate lever arm, said drive lever and said bell crank directly or indirectly causes actuation of said strut to reduce an opening speed of the tailgate and wherein said bell crank and strut are pivotally connected generally within a vehicle rear sill.

19. A vehicle tailgate movement assist mechanism according to claim 18, wherein rotation of the tailgate from an opened to a closed position simultaneously rotates said tailgate lever arm to impart movement to said drive lever and said bell crank, and wherein movement of at least one of the tailgate, said tailgate lever arm, said drive lever and said bell crank directly or indirectly causes release of energy of said strut to assist with closing of the tailgate.

* * * * *